United States Patent [19]

Langner

[11] Patent Number: 4,615,646

[45] Date of Patent: Oct. 7, 1986

[54] FLOWLINE CONNECTION MEANS

[75] Inventor: Carl G. Langner, Spring, Tex.

[73] Assignee: Shell Oil Company, Houston, Tex.

[21] Appl. No.: 614,424

[22] Filed: May 25, 1984

[51] Int. Cl.$^4$ .......................... F16L 1/04; E21B 43/01
[52] U.S. Cl. .................................. 405/169; 166/347; 405/171
[58] Field of Search ............... 405/158, 169, 170, 171, 405/195; 166/338, 343, 344, 345, 347, 349

[56] References Cited

U.S. PATENT DOCUMENTS

| | | | |
|---|---|---|---|
| 3,434,296 | 3/1969 | Otteman et al. | 405/169 X |
| 3,973,625 | 8/1976 | Baugh | 166/347 X |
| 4,041,719 | 8/1977 | Baugh | 405/169 |
| 4,102,146 | 7/1978 | Dietrich | 405/169 |

*Primary Examiner*—David H. Corbin

[57] ABSTRACT

The present invention provides a method and apparatus for connecting a flowline to a subsea structure. A riser and flowline connection tool are deployed downwardly to the subsea structure and a flowline terminal head, which is at the end of the flowline, is pulled to the flowline connection tool by means of a pullcable. Then the flowline terminal head is secured to the subsea structure and the flowline connection tool is recovered to the surface. The flowline terminal head consists of a connector hub to which the flowline is welded, a curved carrier pipe into which the end of the flowline is inserted, a bullnose to which the pullcable is attached, and a dovetail tenon which engages a dovetail receptacle to secure the terminal head to the subsea structure. The flowline terminal head may include buoyancy which keeps it free of difficult terrain in the vicinity of the subsea structure.

8 Claims, 7 Drawing Figures

FLOWLINE CONNECTION MEANS

BACKGROUND OF THE INVENTION

In accordance with applicant's application Ser. No. 499,013 filed May 27, 1983, a flowline bundle is connected to a subsea production facility by using a riser to deploy a flowline connection tool to the production facility and then using the connection tool and a pullcable to pull the flowline bundle to the production facility. To avoid undue stresses in the flowline bundle, due to the terrain around the subsea structure, etc., it is necessary to prepare the terminal end of the flowline bundle so that it may easily move over such terrain. In addition, it is desirable, once the flowline bundle reaches the subsea production facility, to have the bundle readily securable to the facility and fluid connections easily made.

SUMMARY OF THE INVENTION

The primary purpose of the present invention is to provide a method and apparatus for connecting a pipeline or flowline bundle to a subsea structure, which method and apparatus are relatively simple and economical to use, which do not subject the pipeline or flowline bundle to dangerous stresses, which make the pipeline or flowline bundle readily securable to the subsea structure, and which allow the fluid connections to be easily made.

Preferably, a riser and flowline connection tool are deployed downwardly and landed onto the subsea structure, simultaneously as the pipeline or flowline bundle is deployed onto the seabottom a short distance away. A terminal head at the end of the pipeline or flowline bundle is then pulled up to the connection tool using a pullcable and a cable pulling means which is part of the connection tool. Next, the connection tool is used to grip, orient and align the terminal head with a flowline receptacle which is part of the subsea structure. Finally, the terminal head is secured to the flowline receptacle of the subsea structure, and the connection tool and riser are recovered to the surface.

More preferably, the terminal head is secured to the subsea structure by vertically inserting a dovetail of the terminal head into a dovetail receptacle of the subsea structure. Also preferably, the terminal head is secured to the connection tool by pulling a bullnose of the terminal head into a bullnose receptacle of the connection tool, engaging a connector hub of the terminal head with a hub receptacle of the connection tool, then removing the bullnose from the terminal head and moving the terminal head downwardly to secure the terminal head to the subsea structure. The flowline terminal head of the present invention preferably includes a carrier pipe which encloses the end of the flowline, this pipe being preformed into a curved section ending in two connected legs, and buoyancy means such as syntactic form which at least partially offsets the weight of the flowline terminal head.

Other purposes, distinctions over the art, advantages and features of the invention will be apparent to one skilled in the art upon review of the following.

DESCRIPTION OF THE PREFERRED EMBODIMENT

Figure 1:
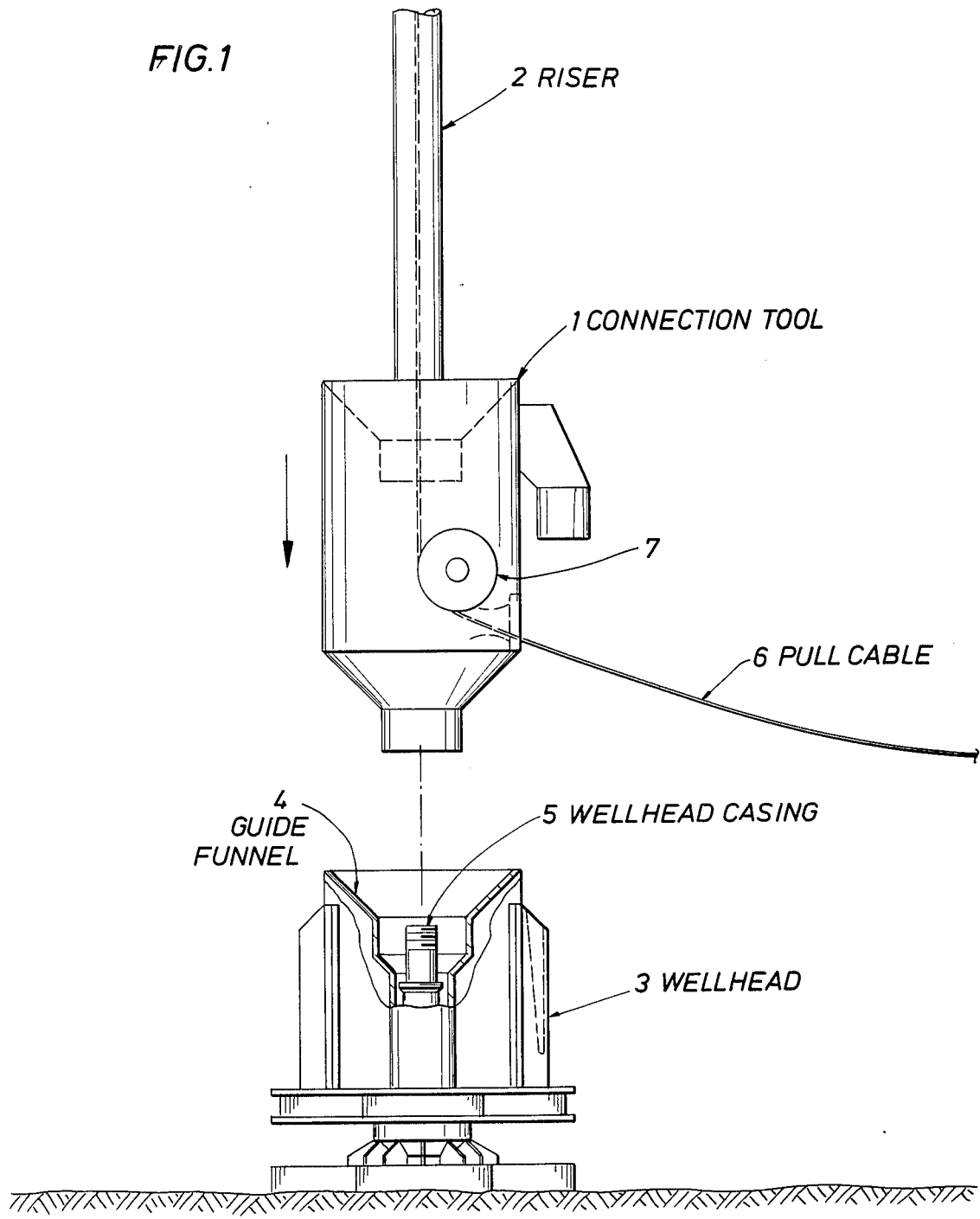
FIG. 1 shows landing a connection tool onto a wellhead.

The present invention is relevant to embodiments wherein an offshore pipeline or flowline bundle (both "pipeline" and "flowline bundle" hereinafter being termed "flowline") is deployed essentially vertically to a subsea structure such as a production facility which may be an individual subsea wellhead, a multi-well subsea template, an underwater manifold center, a tension leg platform base structure, etc. This invention pertains in particular to a method and apparatus for connecting the flowline to the subsea production facility. During the connection operation, the apparatus to be used with a drilling ship (as used hereinafter, "drilling ship" will include all "surface craft" suitable for deploying a "riser" or the like) will typically include a riser, a connection tool, a pullcable, a flowline, a flowline terminal head, and receptacles for both the connection tool and the flowline terminal head, which receptacles are part of the subsea structure. The connection tool is deployed at the lower end of the riser and contains remotely controlled mechanisms for latching onto the subsea structure, for hauling in the pullcable and thereby pulling up the flowline terminal head to the connection tool, for gripping and orienting the terminal head and securing it to the subsea structure, and for releasing from both the flowline terminal head and the subsea structure. Applicant's co-pending applications Ser. Nos. 499,013 filed May 27, 1983; 516,086 filed July 22, 1983; 564,605 filed Dec. 22, 1983 and 614,425 filed May 25, 1984 are incorporated herein for more specific disclosure of the flowline connection tool and other apparatus and procedures.

The connection of the flowline to the subsea structure is accomplished by first stationing a drilling ship over the subsea structure and deploying a connection tool at the end of a riser down to the subsea structure, such as a wellhead. A pullcable from the connection tool is connected to a terminal head at the end of a flowline, which terminal head typically has flotation that permits the flowline and terminal head to be pulled across terrain surrounding the subsea structure, such as seabottom undulations, boulders, mud, etc., without damage to the flowline or terminal head. The terminal head is then pulled up to the connection tool using the pullcable and a cable pulling means which is part of the connection tool. Next, the connection tool is used to grip and orient the terminal head as necessary to align the terminal head with a flowline receptacle which is part of the subsea structure. Next, the terminal head is secured to the flowline receptacle by inserting a wedge-shaped element (dovetail tenon) of the flowline terminal head into a mating feature (dovetail mortise) of the flowline receptacle. Finally, the connection tool is released from both the terminal head and subsea structure, and the riser and connection tool are recovered to the surface.

The present invention is advantageous in comparison to the prior art inasmuch as (1) the connection procedure is independent of the water depth, and therefore is especially advantageous in very deep waters where conventional methods are found to be difficult and tedious; (2) the flowline, flowline termination, and flowline receptacle can be made small and simple, since all connection operations and controls are incorporated into the connection tool and are transmitted thereto via control lines in the riser; (3) The dovetail connection between the terminal head and the subsea structure is simple and strong, and accurately positions the connector hub relative to the structure, thus enabling fluid connections with, e.g., a tree to be installed later, to be easily and reliably made.

Having thus generally described the apparatus and method of the present invention, as well as its numerous advantages over the art, the following is a more detailed description thereof, given in accordance with specific reference to the drawings.

As shown in FIG. 1 a connection tool 1, suspended from the end of a riser 2, is positioned above guide funnel 4, which is part of a wellhead 3. Extending outward from pull-in winch 7, which is a built-in part of connection tool 1, is pullcable 6. Alternatively, pullcable 6 may pass downward through riser 2 from a winch on the surface vessel, as shown by the dashed line in FIG. 1, and then pass around pulley 7 and outward from connection tool 1.

Figure 2:
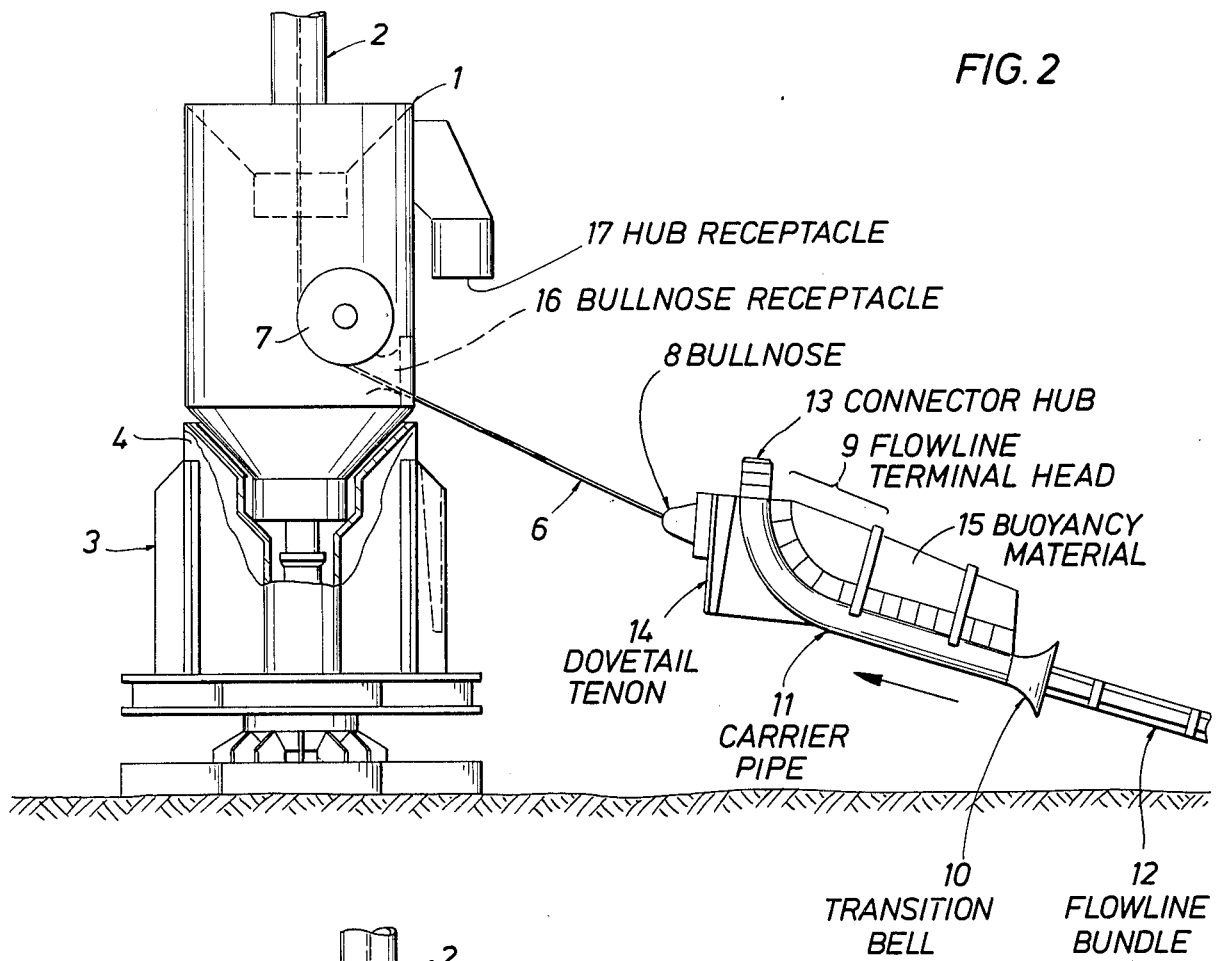
FIG. 2 discloses pulling a flowline terminal head up to the connection tool using a pullcable and a winch which is built into the connection tool.

In FIG. 2, pullcable 6 is shown attached to bullnose 8 at the end of flowline terminal head 9. As shown by the direction of the arrow in FIG. 2, the terminal head 9 is being pulled toward connection tool 1 by pullcable 6. The pulling occurs only after connection tool 1 is securely positioned inside guide funnel 4 of wellhead 3 and latched onto the wellhead casing 5. Terminal head 9 has a pre-bent J-shape with a transition bell 10 at one end of carrier pipe 11 into which flowline bundle 12 extends, and a flowline connector hub 13 at the other end thereof. Flowline bundle 12 is attached (e.g. welded) to the connector hub 13, which adapts to a tree connector (not shown). Carrier pipe 11 is preferably about 12 to 20 inches in diameter, depending on the number and size of the flowlines, and has a minimum radius of about 5 feet. Between carrier pipe 11 and bullnose 8 is wellhead dovetail tenon 14 which is adapted to be secured to wellhead 3, as more specifically described hereinafter. Attached to carrier pipe 11 is a buoyancy material 15, such as syntactic foam, in sufficient quantity to offset the weight of terminal head 9. The buoyancy material may be arranged in other ways, e.g. encircling carrier pipe 11.

Figure 3:
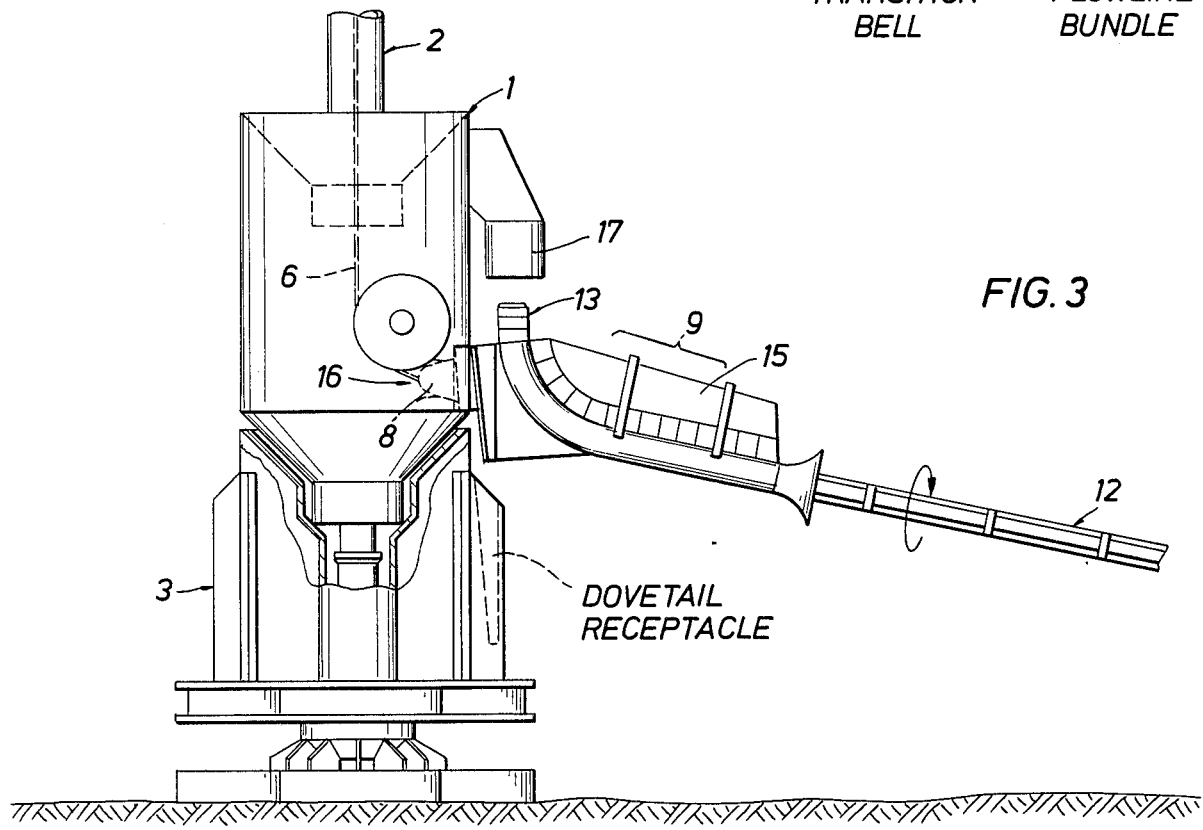
FIG. 3 shows gripping and orienting the flowline terminal head by inserting a bullnose on the terminal head into a bullnose receptacle on the connection tool.

FIG. 3 shows the procedure for gripping and orienting the terminal head 9. Pullcable 6 has pulled bullnose 8 into bullnose receptcle 16 of connection tool 1. Next, terminal head 9 is rotated until connector hub 13 is aligned with hub receptacle 17 of connection tool 1. Rotation may be necessary since there is a tendency for the flowline 12 to twist as it is pulled toward connection tool 1. The location of buoyancy 15 at the upper part of terminal head 9 tends, however, to keep rotation of the flowline to a minimum.

Figure 4:
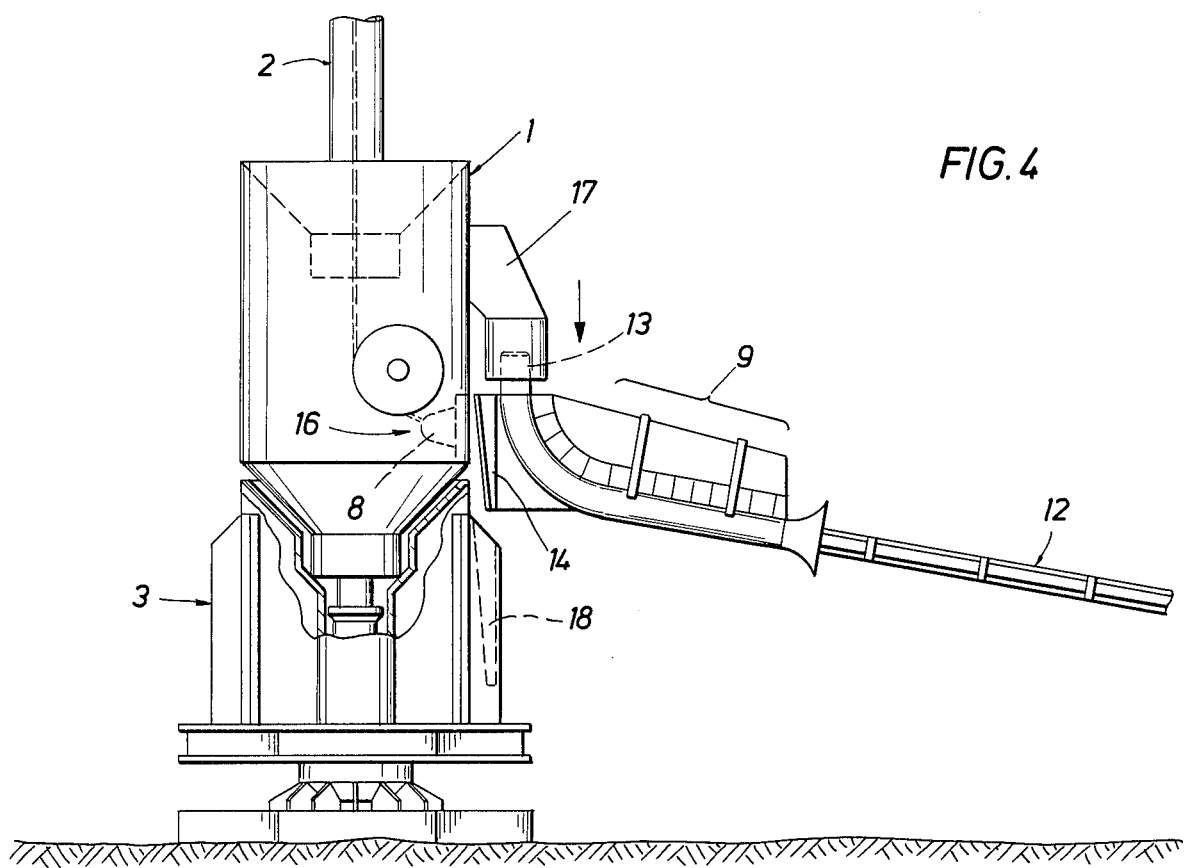
FIG. 4 depicts gripping a flowline connector hub and removing the bullnose from the flowline terminal head.

The procedure for gripping connector hub 13 and removing bullnose 8 is shown in FIG. 4. As indicated by the direction of the arrow, hub receptacle 17 is moved downwardly to enclose and grip connector hub 13. Now it is feasible to remove bullnose 8 from terminal head 9, leaving connector hub 9 suspended solely from hub receptacle 17. Bullnose 8 is left inside bullnose receptacle 16, pending recovery of connection tool 1 to the surface.

Figure 5:
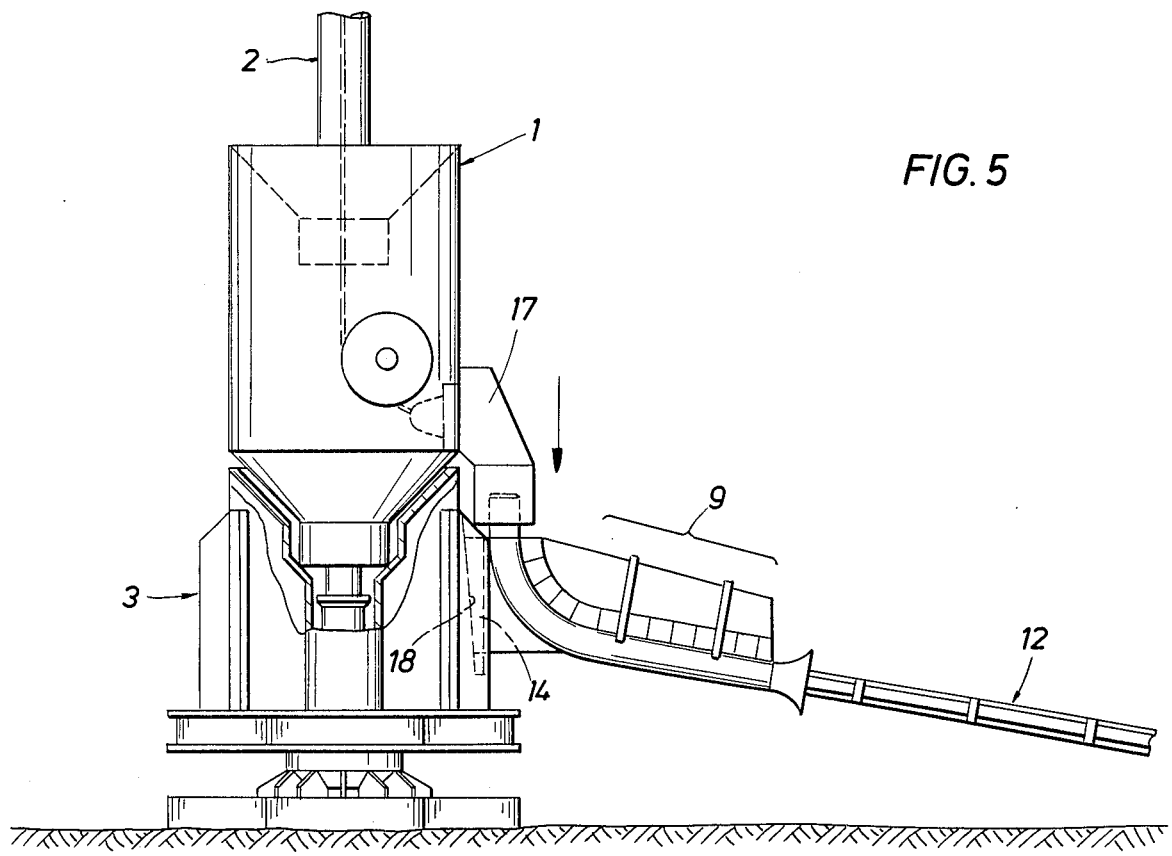
FIG. 5 discloses positioning and securing the flowline terminal head to the wellhead.
Figure 7:
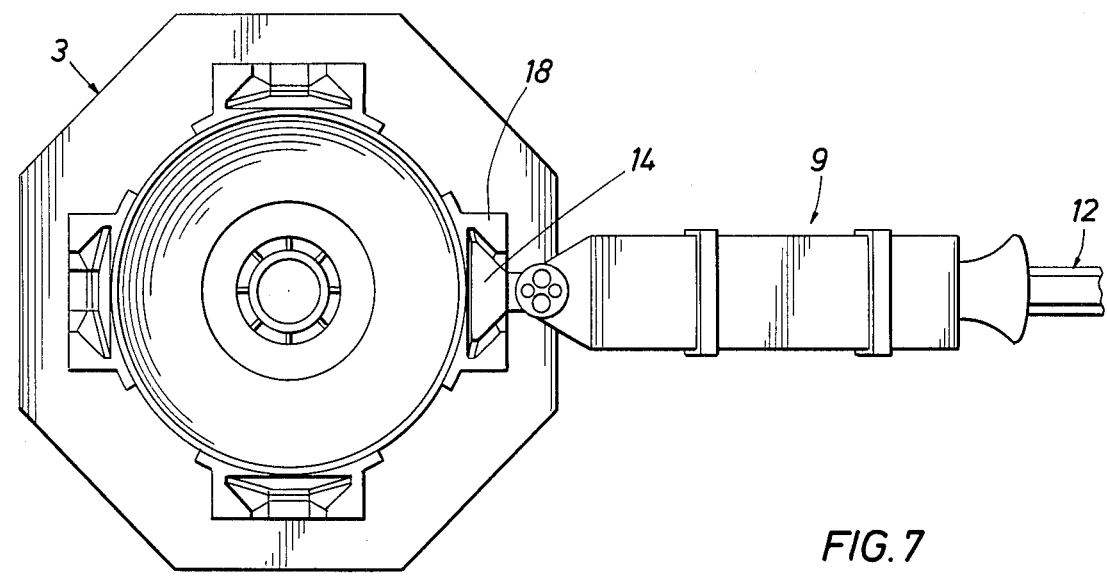
FIG. 7 provides a plan view of the wellhead, flowline, and terminal head, and shows details of a dovetail receptacle.

FIG. 5 discloses positioning and securing terminal head 9 to wellhead 3. This is accomplished, as shown by the direction of the arrow, by moving hub receptacle 17 further down until dovetail tenon 14 of terminal head 9 engages dovetail receptacle 18 (or mortise) of wellhead 3. A plan view of wellhead 3 is shown in FIG. 7 which better shows how dovetail tenon 14 fits inside dovetail receptacle 18. Preferably, dovetail receptacles are provided in two or more sites around wellhead 3, to facilitate the laying of flowlines to the wellhead from various approach directions.

Figure 6:
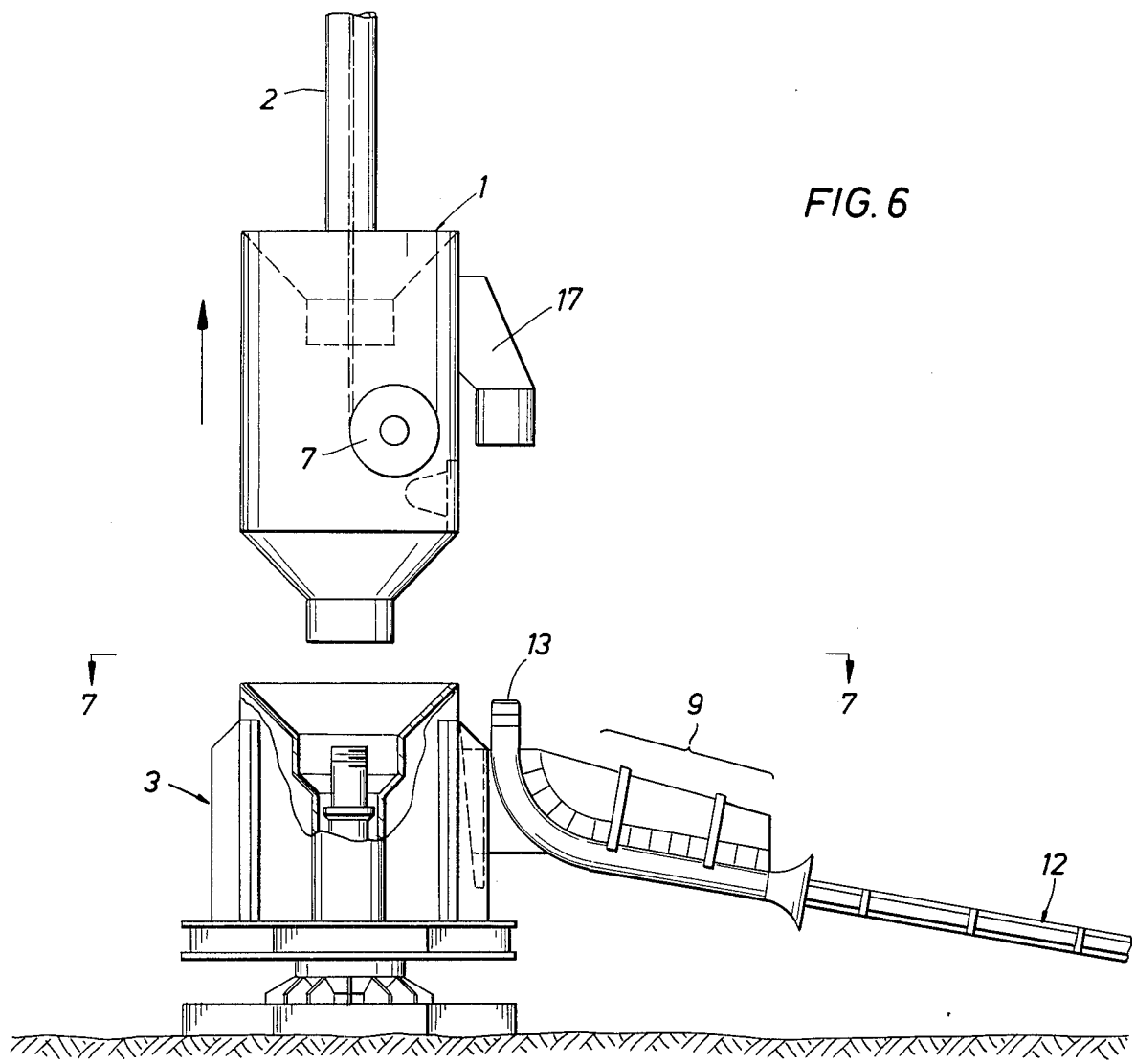
FIG. 6 depicts recovering the connection tool to the surface.

FIG. 6 shows recovering the flowline connection tool 1 to the surface, after having disengaged hub receptacle 17 from hub 13. The flowline 12 is now properly positioned to make fluid connection with a tree (not shown) of wellhead 3 via terminal head 9 and connector hub 13.

The foregoing description of the invention is merely intended to be explanatory thereof, and various changes in the details of the described method and apparatus may be made within the scope of the appended claims without departing from the spirit of the invention.

What is claimed is:

1. A method for connecting a flowline to a subsea structure comprising:
    deploying a riser and flowline connection tool downwardly to the subsea structure;
    landing and securing the connection tool onto the subsea structure;
    pulling a flowline terminal head on sea-bottom toward the flowline connection tool, the terminal head being connected to the flowline and to the flowline connection tool and having an upwardly extending leg terminating in a connector hub;
    maintaining the flowline terminal head in an upright position during pulling by attaching buoyancy means to an upper side of the flowline terminal head;
    connecting the flowline terminal head to the flowline connection tool;
    engaging the connector hub of the flowline terminal head with a hub receptacle of the flowline connection tool and moving the flowline connection tool and flowline terminal head downwardly and forming an interlocking joint between the flowline connection tool and the subsea structure;
    disconnecting the flowline terminal head from the flowline connection tool; and
    recovering the flowline connection tool to the surface.

2. The method of claim 1 wherein said interlocking joint comprises a dovetail tenon of the terminal head and a dovetail receptacle of the subsea structure.

3. The method of claim 1 wherein the flowline terminal head is secured to the subsea structure by vertically inserting a dovetail tenon of the terminal head into a dovetail receptacle (or mortise) of the subsea structure.

4. An apparatus for connecting a flowline to a subsea structure comprising:
    means for deploying a riser and flowline connection tool downwardly to the subsea structure;

means for landing and securing the flowline connection tool onto the subsea structure;

means for pulling a flowline terminal head on sea-bottom toward the flowline connection tool, the terminal head being connected to the flowline and to the flowline connection tool and having an upwardly extending leg terminating in a connector hub;

buoyancy means attached to an upper side of the flowline terminal head which is operative to offset the weight of the terminal head and to resist rotation of the flowline during pulling of the flowline with the terminal head;

means for connecting the flowline terminal head to the flowline connection tool;

means for moving the flowline connection tool and flowline terminal head downwardly and forming an interlocking joint between the flowline connection tool and the subsea structure;

means for disconnecting the flowline terminal head from the flowline connection tool; and means for recovering the flowline connection tool to the surface.

5. The apparatus of claim 4 wherin said interlocking joint comprises a dovetail tenon of the flowline terminal head and a dovetail receptacle of the subsea structure.

6. The apparatus of claim 4 wherein the flowline terminal head has up to a 90-degree bend with a flowline connection hub extending upwardly as the flowline extends downwardly and laterally away from the subsea structure.

7. The apparatus of claim 6 wherein the flowline terminal head has a bullnose which is engageable with a bullnose receptacle of the flowline connection tool and a connector hub which is engageable with a hub receptacle of the flowline connection tool, and including means for removing the bullnose from the flowline terminal head and moving the flowline terminal head downwardly to secure the terminal head to the subsea structure.

8. The apparatus of claim 7 wherein the securing means comprises a dovetail tenon of the terminal head which is engageable with a dovetail receptacle of the subsea structure.

* * * * *